US008681364B2

(12) United States Patent  
Muta

(10) Patent No.: US 8,681,364 B2  
(45) Date of Patent: Mar. 25, 2014

(54) PRINTING APPARATUS AND PRINTING METHOD

(75) Inventor: Keisuke Muta, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 164 days.

(21) Appl. No.: 13/432,531

(22) Filed: Mar. 28, 2012

(65) Prior Publication Data

US 2012/0250087 A1   Oct. 4, 2012

(30) Foreign Application Priority Data

Apr. 1, 2011   (JP) .................................. 2011-081681

(51) Int. Cl.
*G06F 3/12* (2006.01)
*G06F 15/00* (2006.01)
*G06K 15/00* (2006.01)

(52) U.S. Cl.
USPC ......... 358/1.15; 358/1.13; 358/1.14; 358/1.9; 358/1.6; 358/1.1

(58) Field of Classification Search
None
See application file for complete search history.

(56) References Cited

U.S. PATENT DOCUMENTS

| 2002/0067496 A1* | 6/2002 | Nishikata et al. | 358/1.13 |
| 2002/0149788 A1* | 10/2002 | Nishikata et al. | 358/1.14 |
| 2004/0263873 A1* | 12/2004 | Sato et al. | 358/1.6 |
| 2006/0279814 A1* | 12/2006 | Fukada et al. | 358/540 |
| 2011/0149318 A1* | 6/2011 | Fukada et al. | 358/1.9 |
| 2011/0286021 A1* | 11/2011 | Hirasawa | 358/1.9 |

FOREIGN PATENT DOCUMENTS

JP   2005-063051 A   3/2005

* cited by examiner

Primary Examiner — Satwant Singh  
(74) Attorney, Agent, or Firm — Kilpatrick Townsend & Stockton LLP

(57) ABSTRACT

When data is input, print setting information of the data is preserved, and if two pieces of previous and present print setting information are not present, print job data starts to be created, and job start "JS", print setting information, printing command, image data are added. On the other hand, if two pieces of previous and present print setting information are present, it is judged whether or not the previous and present print setting information are the same as each other. If both the pieces of the print setting information are the same as each other, printing command and image data are added to print job data during creation. In this case, a setting unit omits settings of processing conditions which a printing unit uses for a printing process, performed based on the print setting information, for subsequent data.

8 Claims, 6 Drawing Sheets

DATA D

PRINT JOB DATA JD

PRINTING APPARATUS AND PRINTING METHOD

This application claims priority to Japanese Patent Application No. 2011-081681, filed Apr. 1, 2011, the entirety of which is incorporated by reference herein.

BACKGROUND

1. Technical Field

The present invention relates to a printing apparatus which has a function of generating job data based on input data, and a printing method.

2. Related Art

For example, JP-A-2005-63051 discloses a printing apparatus which continuously prints a plurality of pages, wherein preceding paper feeding where the next page starts to be fed in the course of printing the current page is performed so as to reduce a time interval from the printing completion of the current page to the printing start of the next page, thereby improving printing throughput.

The printing apparatus has a configuration where the preceding paper feeding command for the next page is incorporated into print job data in which the current page received from a host apparatus (upper-rank apparatus) is divided with the band units or raster units, and preceding paper feeding of the next page starts based on the preceding paper feeding command in the course of printing the present page.

However, in a case where the host apparatus is a portable information terminal, which has a relatively small storage capacity of the memory as compared with a personal computer (PC), it is not appropriate to install a printer driver having a considerable data size embedded in the PC in the portable information terminal. For this reason, a configuration is employed in which the printing apparatus side has the relatively important function of the printer driver, and the printing apparatus side processes display data received from the portable information terminal. For example, data including print setting information and image data is transmitted from the portable information terminal to the printing apparatus. The print setting information corresponds to print setting conditions and includes sheet kinds, sheet sizes, printing colors (color or monochrome), printing quality (high quality or draft), and the like.

In this case, the printing apparatus includes a print job conversion portion which generates print job data based on the print setting information and the image data of the data received from the portable information terminal, and a printing unit which generates engine control data by performing image processes for the image data of the print job data and controls a printing head and various motors based on the generated engine control data. The printing unit includes an image processing unit which generates the engine control data by performing image processes such as, for example, a resolution conversion process, a color conversion process, and a halftone process, and a printing engine which controls the printing head and various motors based on the engine control data and the like.

Contents of the image process or contents of the engine control performed by the printing unit are different depending on the print setting information. For this reason, before the printing unit performs the image processes or the engine control, it is necessary to perform an initialization process in advance so as to set initial values of parameters used for the image processes or initial values of parameters used for the control of the printing head or the motors. This initialization process (a setting process of processing conditions) is performed for each piece of data based on print setting information included in data received from the host apparatus such as a portable information terminal.

However, there are cases where print setting information is the same even in other pieces of data sent from the host apparatus. In these cases, although an initial value (the processing condition) of the parameter whose print setting information is set to be the same is the same, the printing unit performs the initialization process (the setting process of processing conditions) for each piece of data. Since the initialization process accompanies a relatively complicated operation, and thus takes a relatively long process time, there is a problem in that time from the data transmission start to the printing start by the printing apparatus becomes relatively long. To perform the initialization process in this way is a major factor delaying the printing start time. In addition, in a case as well where print job data is received from a host apparatus having the printer driver embedded therein, and printing is performed, if it is necessary to perform the initialization process for each piece of print job data, the same problem occurs even if there is a difference in the extent of the delays. Further, in a case as well where, in addition to data reception from the host apparatus, data is read from an external storage medium such as a memory card, or data read from a scanner is input if the printing apparatus is a multifunction machine, the same problem occurs.

SUMMARY

An advantage of some aspects of the invention is to provide a printing apparatus and a printing method which can reduce a process burden on a setting unit which sets processing conditions used for a printing process performed by the printing unit.

According to an aspect of the invention, there is provided a printing apparatus which performs printing based on input data, including an input unit that inputs data including print setting information and image data; a printing unit that performs a printing process based on the data; a setting unit that sets processing conditions which the printing unit uses for the printing process based on the print setting information included in the data; and a judging unit that compares print setting information included in preceding data which is previously input by the input unit with print setting information included in subsequent data which is input following the preceding data, and judges whether or not both the pieces of the print setting information are the same as each other, (A) wherein, if it is judged by the judging unit that both the pieces of the print setting information are the same as each other, the printing unit performs a printing process based on the preceding data and the subsequent data according to processing conditions which are set by the setting unit based on the print setting information of the preceding data, and (B) wherein, if it is judged by the judging unit that both the pieces of the print setting information are different from each other, the printing unit performs a printing process based on the preceding data according to processing conditions which are set by the setting unit based on the print setting information of the preceding data, and the printing unit performs a printing process based on the subsequent data according to processing conditions which are set by the setting unit based on the print setting information of the subsequent data.

According to the aspect of the invention, the judging unit compares print setting information included in preceding data which is previously input by the input unit with print setting information included in subsequent data which is input following the preceding data, and judges whether or not both the pieces of the print setting information are the same as each other. If it is judged by the judging unit that both the pieces of the print setting information are the same as each other, the printing unit performs a printing process based on the preceding data and the subsequent data according to processing conditions which are set by the setting unit based on the print setting information of the preceding data. On the other hand, if it is judged by the judging unit that both the pieces of the print setting information are different from each other, the printing unit performs a printing process based on the preceding data according to processing conditions which are set by the setting unit based on the print setting information of the preceding data, and the printing unit performs a printing process based on the subsequent data according to processing conditions which are set by the setting unit based on the print setting information of the subsequent data. Therefore, if it is judged by the judging unit that both the pieces of print setting information are the same as each other, the setting unit does not perform a setting process of processing conditions based on the print setting information of the subsequent data. Thus, it is possible to reduce a burden of the setting process performed by the setting unit. For example, it is possible to contribute to improvement in printing throughput of the printing apparatus.

The printing apparatus according to the aspect of the invention may further include a job generation unit that generates job data based on the data input by the input unit and outputs the generated job data to the printing unit, and the printing unit may perform the printing process based on the job data. Here, preferably, (A) if it is judged by the judging unit that both the pieces of the print setting information are the same as each other, the job generation unit generates a single piece of job data including the print setting information, image data included in the preceding data, and image data included in the subsequent data, and, (B) if it is judged by the judging unit that both the pieces of the print setting information are different from each other, the job generation unit separately generates job data for each of the preceding data and the subsequent data.

According to the aspect of the invention, if it is judged by the judging unit that both the pieces of the print setting information are different from each other, job data for each of the preceding data and the subsequent data is separately generated. On the other hand, if it is judged by the judging unit that both the pieces of the print setting information are the same as each other, a single piece of job data including the print setting information, image data included in the preceding data, and image data included in the subsequent data, is generated. For this reason, even if a configuration of the printing unit which performs a printing process based on job data is not modified, it is possible to omit a setting process of processing conditions based on the print setting information of the subsequent data.

The printing apparatus according to the aspect of the invention may further include a preserving unit that preserves the print setting information of the preceding data. Here, the job generation unit may output the job data to the printing unit in an order to be generated from starting to finishing, in addition, the printing apparatus may further include a determination unit that determines whether or not remaining data for which the printing unit does not perform a printing process is less than a defined value, of the job data before being finished, generated based on the preceding data. At this time, if it is determined that the remaining data is less than the defined value, the job generation unit preferably finishes the job data before being finished without waiting for subsequent data necessary for the determination unit to perform determination.

According to the aspect of the invention, the determination unit that determines whether or not remaining data for which the printing unit does not perform a printing process is less than a defined value, of the job data before being finished, generated based on the preceding data. If it is determined that the remaining data is less than the defined value, the job generation unit preferably finishes the job data before being finished without waiting for subsequent data necessary for the determination unit to perform determination. For this reason, it is possible to prevent a problem that the printing unit continuously waits for finishing (for example, a finishing command) of the job data.

In the printing apparatus according to the aspect of the invention, preferably, in a case where it is determined by the determination unit that the remaining data is not less than the defined value, (A) if it is judged by the judging unit that both the pieces of the print setting information are different from each other, the job generation unit finishes the job data before being finished, and (B) if it is judged by the judging unit that both the pieces of the print setting information are the same as each other, the job generation unit adds image data of the subsequent data to the job data before being finished.

According to the aspect of the invention, even in a case where the remaining data is not less than the defined value, if it is judged by the judging unit that both the pieces of the print setting information are different from each other, the job generation unit finishes the job data before being finished. On the other hand, in a case where the remaining data is not less than the defined value, if it is judged by the judging unit that both the pieces of the print setting information are the same as each other, the job generation unit sequentially adds image data of the subsequent data to the job data before being finished. Accordingly, it is possible to add image data of a plurality of pieces of subsequent data to job data based on preceding data. Thus, it is possible to further reduce a processing burden of the setting unit since the number of data for which a setting process of processing conditions is performed is decreased.

In the printing apparatus according to the aspect of the invention, preferably, the printing unit includes an image processing unit that performs an image process for the image data, and the setting unit sets image processing conditions which the image processing unit uses for the image process based on the print setting information.

According to the aspect of the invention, if it is determined that both the pieces of print setting information are the same as each other, it is possible to omit a setting process of image processing conditions which are set by the setting unit based on the print setting information.

In the printing apparatus according to the aspect of the invention, preferably, the printing unit includes a printing head that performs printing on a printing medium and a printing engine that controls the printing head, and the setting unit sets control processing conditions which the printing engine uses for control of the printing head based on the print setting information.

According to the aspect of the invention, if it is determined that both the pieces of print setting information are the same as each other, it is possible to omit a setting process of control processing conditions which are set by the setting unit based on the print setting information.

In the printing apparatus according to the aspect of the invention, the print setting information preferably includes a resolution of image data, printing quality defining a printing resolution, and the kind of printing medium. In addition, the kind of printing medium is a conception including at least one of a printing medium kind and a printing medium size.

According to the aspect of the invention, processing conditions are set using at least a resolution of image data, printing quality defining a printing resolution, and the kind of printing medium, included in the print setting information. Even if image data having different resolutions is input, or a printing resolution or a kind of printing medium is changed by printing quality, processing conditions according thereto can be set.

According to another aspect of the invention, there is provided a printing method which performs printing based on input data, includes inputting data including print setting information and image data; causing a printing unit to perform a printing process based on the data; setting processing conditions which the printing unit uses for the printing process based on the print setting information included in the data; and comparing print setting information included in preceding data which is previously input in the inputting of the data with print setting information included in subsequent data which is input following the preceding data, and judging whether or not both the pieces of the print setting information are the same as each other, (A) wherein, if it is judged that both the pieces of the print setting information are the same as each other, in the judging, a printing process is performed based on the preceding data and the subsequent data according to print processing conditions which are set in the setting of the processing conditions based on the print setting information of the preceding data, in the performing of the printing process, and, (B) wherein, if it is judged that both the pieces of the print setting information are different from each other, in the judging, a printing process is performed based on the preceding data according to processing conditions which are set in the setting of processing conditions based on the print setting information of the preceding data, and a printing process is performed based on the subsequent data according to processing conditions which are set in the setting of processing conditions based on the print setting information of the subsequent data, in the performing of the printing process. According to the aspect of the invention, it is possible to achieve the same operations and effects as in the aspect of the printing apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a composite type printer which is of an ink jet type which is an example of the printing apparatus according to an embodiment of the invention will be described with reference to FIGS. 1 to 7.

Figure 1:
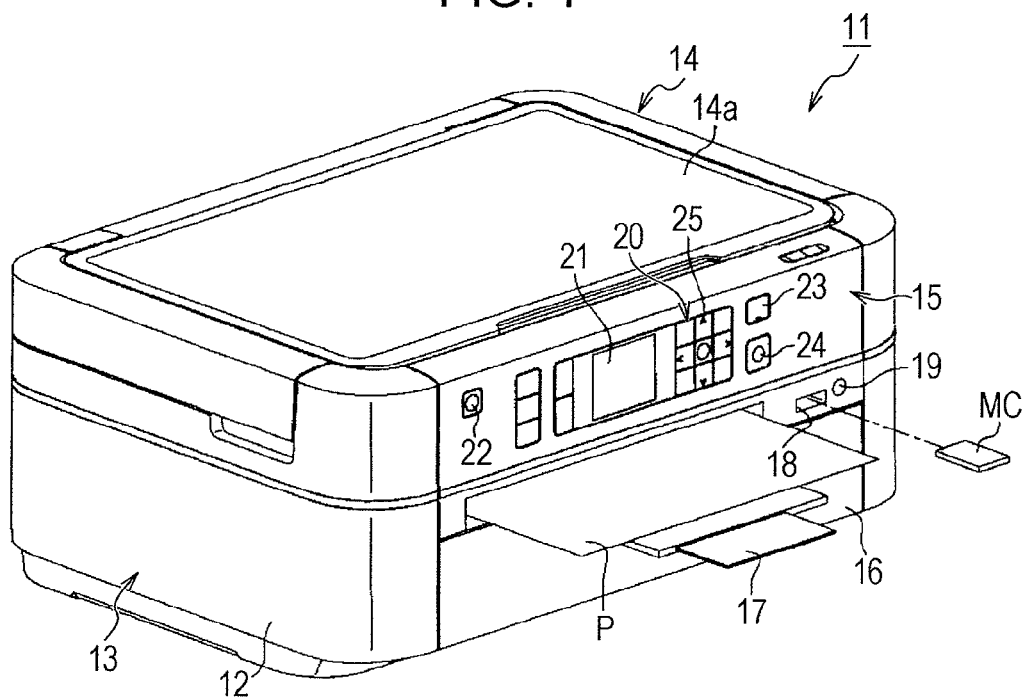
FIG. 1 is a perspective view of a composite type printer according to an embodiment.

As shown in FIG. 1, a single composite type printer (hereinafter, simply referred to as a "printer 11") is an ink jet type color printer having three functions of a scanner, a printer, and a copier. In an almost rectangular main body 12 of the printer 11, a lower part thereof forms a printer portion 13 which performs printing (recording) on a printing medium such as a paper sheet P, and an upper part thereof forms a scanner portion 14 which has an opening and closing type platen cover 14a on its upper surface. In addition, an operation panel 15 is provided on the upper front surface of the main body 12, and a paper feeding cassette 16 which can accommodate a plurality of paper sheets P is provided on the lower side of the operation panel 15 in a state of being insertable and drawable.

The printer portion 13 performs printing on the paper sheets P one by one fed from the paper feeding cassette 16, and delivers the paper sheet P after being printed onto a sliding type paper delivery tray 17 which is provided at the front intermediate end position of the main body 12. The scanner portion 14 is used to read (scan) an original document which is set on a platen (not shown) located on the lower side than the platen cover 14a. In addition, the printer 11 performs copying by the pixel electrodes 13 printing an image of the original document which has been read by the scanner portion 14.

In addition, a card slot 18 to and from which a memory card MC is insertable and drawable, and a communication section 19 which can communicate with a host apparatus 120 (refer to FIG. 3) in a wireless manner are provided at the right position of the paper delivery tray 17 on the front surface of the printer 11 in FIG. 1.

The operation panel 15 includes an operation portion 20 used to perform various operations for the printer 11, and a display portion 21 which displays various menus or images. The operation portion 20 is provided with a power switch 22, a printing start switch 23, a copying switch 24, a selection switch 25, and the like. For example, regular printing (regular printing mode) for performing printing on the paper sheet P is performed by pressing the printing start switch 23. In a mode selection menu displayed on the display portion 21 through an operation of the selection switch 25, one mode can be selected from a plurality of modes including "card printing", "copying", "scanning", and the like through the operation of the selection switch 25. In a printing system mode such as the card printing mode, printing conditions can be set separately through the operation of the selection switch 25. Here, the "card printing" is used to print an image such as a picture based on image data read from the memory card MC inserted into the card slot 18.

Figure 2:
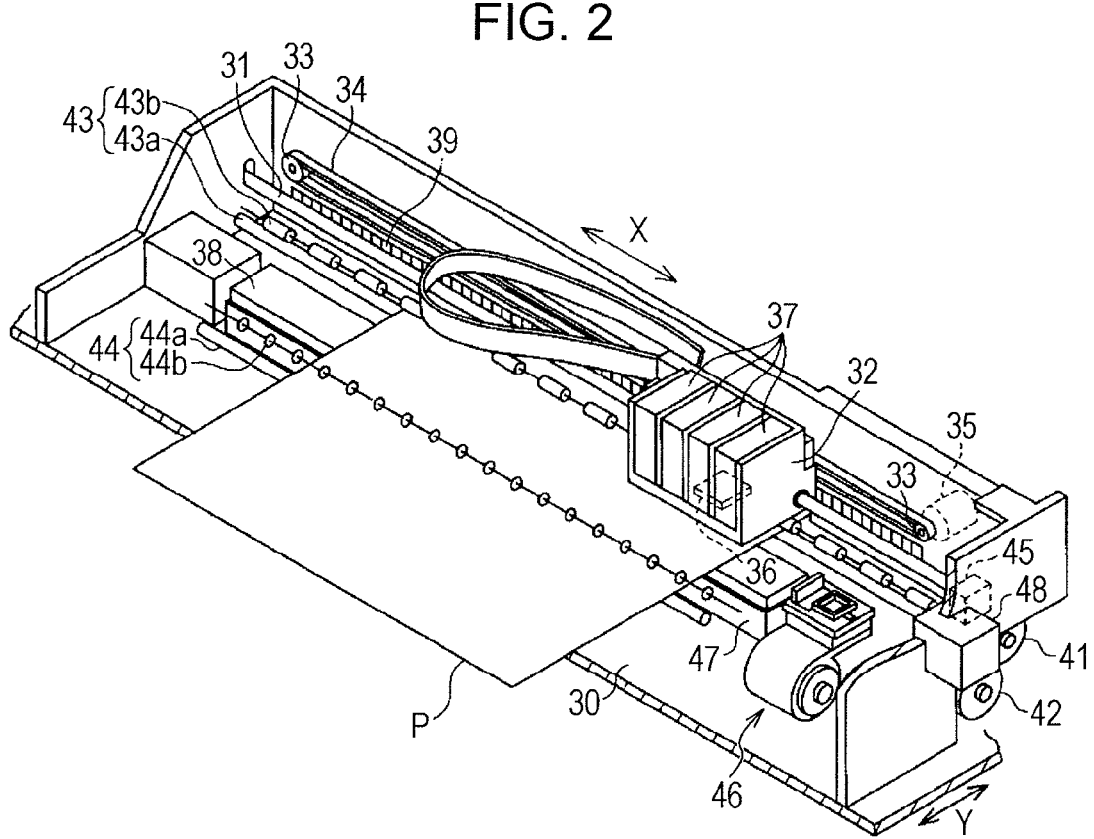
FIG. 2 is a perspective view of a printer portion.

Next, a configuration of the pixel electrodes 13 will be described. FIG. 2 shows the printer portion in a state where an exterior housing is removed. As shown in FIG. 2, a guide shaft 31 is built between the left and right lateral walls of a main body frame 30 of which the upper side and the front side are open and which has a rectangular box shape in the pixel electrodes 13 in FIG. 2, and a carriage 32 is provided so as to reciprocate along the guide shaft 31 in the main scanning direction X. The carriage 32 is fixed to an endless timing belt 34 which is wound on a pair of pulleys 33 which is turnably adds to the inside of the back plate of the main body frame 30. A carriage motor 35 of which the driving axis is turnably adds to the right pulley 33 in FIG. 2 is driven through forward or backward rotation, this causes the timing belt 34 to rotate in a forward or backward direction, and thereby the carriage 32 reciprocates in the main scanning direction X.

An ink jet type printing head 36 is provided on the lower part of the carriage 32. A plurality of nozzles ejecting ink are open on the lower surface of the printing head 36. A plurality of ink cartridges 37 are mounted on the upper part of the carriage 32. The ink cartridges 37 respectively accommodate four-color ink of, for example, black (K), cyan (C), magenta (M), and yellow (Y). The ink colors are not limited to four colors and may be three colors or five to eight colors. The printing head 36 ejects ink supplied from each ink cartridge 37 from the nozzles of each color. In addition, in the printing head 36, a pressing element (a piezoelectric element, an electrostatic element, a heat emitting element) for giving ejection pressure to ink is embedded in each nozzle, a predetermined voltage is applied to the pressing element, and thereby ink droplets are ejected from the corresponding nozzles.

A supporting plate 38 which defines a gap between the printing head 36 and the paper sheet P is provided at the lower side position opposite to the printing head 36. The supporting plate 38 extends in the width direction (the X direction in FIG. 2) in a range including a printing region where the printing head 36 performs printing. During the printing, ink ejected from the printing head 36 lands on a place of the paper sheet P corresponding to the supporting plate 38.

In addition, a linear encoder 39 which outputs the number of pulses proportional to a movement amount of the carriage 32 is provided so as to be arranged along the guide shaft 31 on the rear surface side of the carriage 32.

Further, a feed motor 41 and a transport motor 42 are disposed on the lower right side of the main body frame 30 in FIG. 2. The feed motor 41 drives a feed roller (for example, a pickup roller) (not shown) which feeds a plurality of paper sheets P set in the paper feeding cassette 16 one by one.

A transport roller pair 43 and a delivery roller pair 44 are respectively disposed on the upstream side and the downstream side with the supporting plate 38 interposed therebetween in the transport direction Y. The transport roller pair 43 includes a transport driving roller 43a which is rotatably driven by power of the transport motor 42, and a transport driven roller 43b which comes into contact with and rotates concurrently with the transport driving roller 43a. In addition, the delivery roller pair 44 includes a delivery driving roller 44a which is rotatably driven by power of the transport motor 42, and a delivery driven roller 44b which comes into contact with and concurrently rotates with the delivery driving roller 44a.

The transport motor 42 is rotatably driven such that the transport driving roller 43a and the delivery driving roller 44a are driven, and thereby the paper sheet P is transported in the subject-scanning direction Y in a state of being pinched (nipped) between both the roller pairs 43 and 44.

As shown in FIG. 2, printing of original documents, images, or the like is performed for the paper sheet P by alternately repeating a printing operation where the carriage 32 reciprocates in the main scanning direction X and ink is ejected from the nozzles of the printing head 36 onto the paper sheet P and a feeding operation where the paper sheet P is transported in the subject-scanning direction Y by a predetermined transport amount.

In addition, the pixel electrodes 13 is equipped with an automatic gap adjustment device (hereinafter, referred to as an "APG device 45") which moves the carriage 32 in the vertical direction so as to adjust a gap between the printing head 36 and the supporting plate 38. The APG device 45 is driven such that an appropriately gap is secured according to a sheet kind acquired from print setting information included in data for printing received from the host apparatus or print setting information set through the operation panel 15, and a position of the carriage 32 is adjusted to the height where the appropriate gap is secured.

One end position (right end position in FIG. 2) of the carriage 32 on the movement path in FIG. 2 is a home position. A management device 46 which performs management such as nozzle cleaning for the printing head 36 is disposed directly under the 32 which is disposed at the home position. Waste ink which is suctioned and discharged from the nozzles of the printing head 36 by the management device 46 is discharged to a waste liquid tank 47 which is disposed on the lower side of the supporting plate 38.

In addition, in the embodiment, the transport motor 42 is a power source common to the APG device 45 and the management device 46 in addition to the transport driving roller 43a and the delivery driving roller 44a. If the carriage 32 is disposed at a switching position around the home position, connection to a power transmission switching device 48 is canceled, the transport motor 42 is driven in this disconnection state, and thereby a connection destination (switching destination) to which power is output is selected. If the carriage 32 retracts from the switching position to the printing region, the power transmission switching device 48 is connected to the selected connection destination.

Next, an electric configuration of the printer 11 will be described with reference to FIG. 3. The printer 11 includes a controller 50 which comprehensively controls a scanning system, a printing system, a copying system, a display stem, and the like. The controller 50 is connected to the printing head 36, the carriage motor 35, the feed motor 41, the transport motor 42, the linear encoder 39, an encoder 51, a scan motor 52, a line sensor 53, a memory interface (hereinafter, referred to as a "memory I/F 54"), a USB interface (hereinafter, referred to as a "USB I/F 55"), and a communication section 19 (communication interface). The communication section 19 in this example supports wireless communication. Of course, the communication section 19 may support wired communication.

The encoder 51 detects rotation of a shaft of the transport driving roller 43a or rotation of the other shaft connected to the shaft via a wheel train, and outputs pulses of the cycle which is inversely proportional to the rotation speed of the transport driving roller 43a to the controller 50 by the number proportional to the rotation amount. In addition, the scan motor 52 is a power source used to move a reading head (not shown) forming the scanner portion 14 in the scanning direction. The line sensor 53 is installed in the reading head in a direction perpendicular to the movement direction thereof, reads an original document according to the movement of the reading head, and outputs the reading signal.

Figure 3:
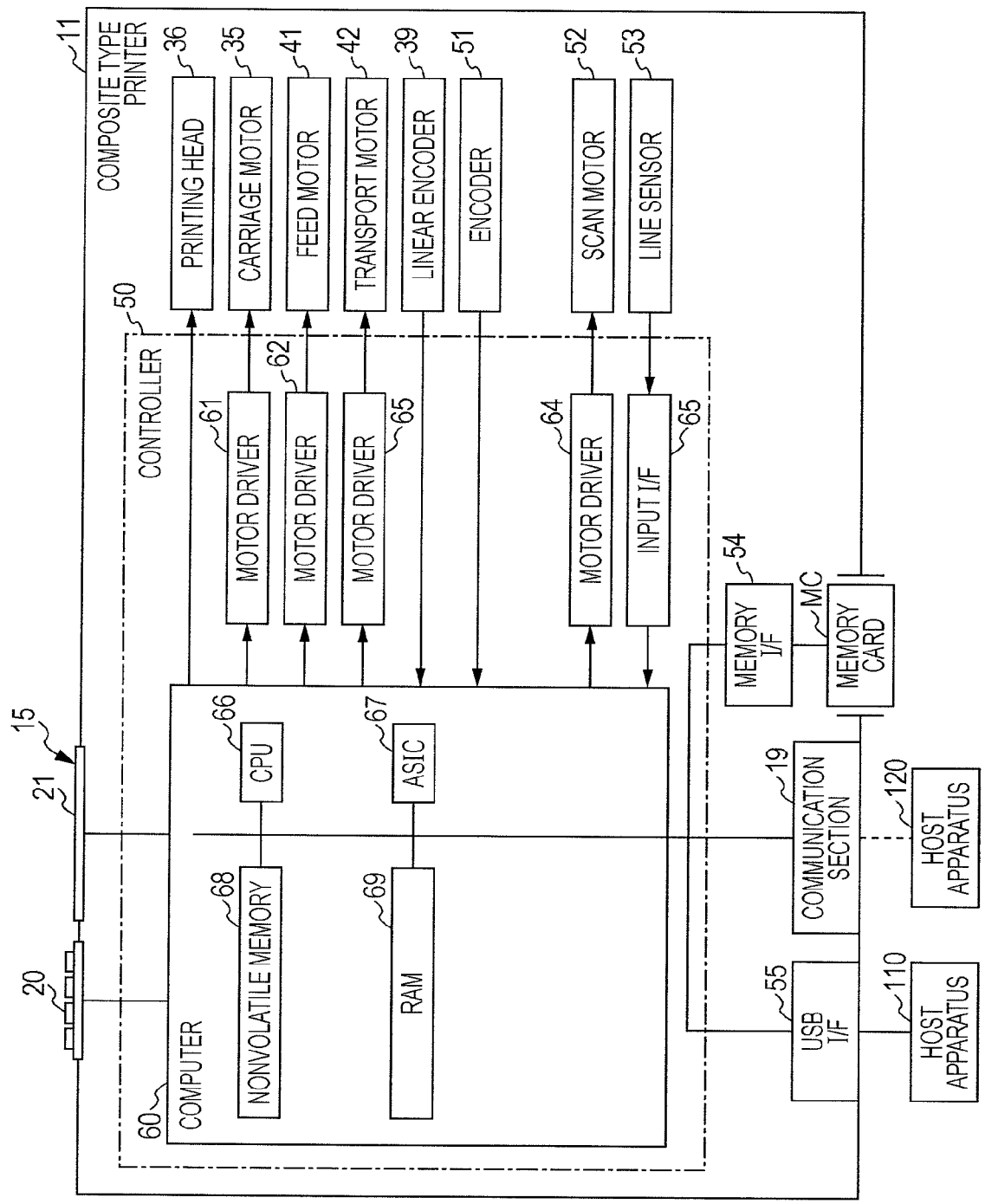
FIG. 3 is a block diagram illustrating an electric configuration of the printer.

As shown in FIG. 3, the controller 50 has a computer 60, motor drivers 61 to 64, and an input I/F 65 embedded therein. The computer 60 is connected to the printing head 36, and is connected to the carriage motor 35, the feed motor 41, and the transport motor 42 via the motor drivers 61 to 64. In addition, the computer 60 is connected to the linear encoder 39 and the encoder 51, and receives pulse signals therefrom. The computer 60 is connected to the scan motor 52 via the motor driver 64 and is connected to the line sensor 53 via the input I/F. In addition, the computer 60 is connected to the memory I/F 54, the communication section 19, and the USB I/F 55. Further, the computer 60 is connected to the operation portion 20 and the display portion 21 of the operation panel 15.

As shown in FIG. 3, the computer 60 has a CPU 66, an ASIC (Application Specific IC) 67, a nonvolatile memory 68, a RAM 69, and the like embedded therein. The nonvolatile memory 68 stores a variety of programs for starting firmware, setting data necessary for a variety of processes, and the like. The CPU 66 executes a program read from the nonvolatile memory 68 and performs a variety of processes such as scanning, printing, and copying. In addition, the ASIC 67 performs an image process described later in order to generate printing data used for a printing process such as printing or copying.

The printer 11 can perform printing based on data received from the host apparatuses 110 and 120 (refer to FIG. 3). In this case, a user operates an operation portion (not shown) of the host apparatuses 110 and 120, and performs a printing execution operation by designating an original document or an image to be printed or setting printing conditions. With the printing execution operation, the host apparatus 110 transmits data to be printed to the printer 11 along with the print setting information.

The host apparatus 110 is constituted by, for example, a personal computer (PC), and has a printer driver embedded therein. For this reason, print job data created by the printer driver is transmitted to the printer 11. On the other hand, the host apparatus 120 is constituted by, for example, a PDA (Personal Digital Assistant), a mobile phone, or the like. Since this kind of the host apparatus 120 has a relatively small memory capacity, software having a relatively large data volume such as the printer driver is not embedded therein, and a minimum of functions such as a transmission function of transmitting data to the printer 11 is embedded therein from the viewpoint of realizing the printing function. For this reason, the printer 11 includes a processing portion which performs the same process as the printer driver in order to realize printing based on data received from the host apparatus 120 which does not include the printer driver. In this example, a user performing printing using this kind of host apparatus 120 first designates an original document or an image to be printed, and sets printing conditions as necessary, thereby performing the printing execution operation. Then, data to be printed is transmitted from a communication section (not shown) included in the host apparatus 120 to the printer 11 via, for example, wireless communication.

In addition, the printer 11 can display a setting screen for setting printing conditions on the display portion 21 when performing regular printing, card printing, and copying. The user selects necessary print setting items through an operation of the selection switch 25, and then performs printing by pressing the printing start switch 23 or the copying switch 24. Further, printing conditions for the host apparatus 120 may be set in advance in the printer 11 side so as to handle a case where detailed printing conditions may not be set in the host apparatus 120.

Here, the printing conditions include a sheet kind, a sheet size, a printing color (color mode) (color or monochrome (grayscale)), printing quality (high quality mode or a draft mode), image correction, layout, and the like. The "printing color" includes "color" set in a case where images are printed in colors, and "monochrome (grayscale)" set in a case where images are printed in monochrome (grayscale). The "printing quality" includes a "high quality mode" set in a case where printing image quality is prior to a printing speed, and a "draft mode" set in a case where a printing speed is prior to printing image quality. In the "layout", "printing layout" for defining a position where a printing image is disposed on a paper sheet region is set, and presence or absence of "frameless printing" is set to print images in a state where there is no margin (frame) on a circumferential edge of the paper sheet. In addition, in the "image correction", presence or absence of "scene correction" for correcting blue of the sky or a skin color of a figure so as to be suitable for the scene is set, and presence or absence of "red-eye correction" for correcting the red eyes of a figure inside a picture image is set. In the following description, setting information of the "presence or absence of frameless printing" of the "layout" is an item separated from the layout item.

If the "high quality mode" is set in the printing quality, microwave printing is performed in order to heighten image quality of a printing image. Here, the microwave printing refers to a method in which in a case where a raster line formed from adjacent dot lines, arranged in the main scanning direction X, printed on a paper sheet by the adjacent nozzles are disposed so as to be adjacent in the subject-scanning direction Y due to a variation in processing accuracy of the nozzle position of the printing head 36, a gap between the raster lines is prevented from being varied due to the variation in the nozzle positions. By performing the microwave process, it is possible to suppress banding (white streaks or the like) occurring in a printing image due to the cause that a gap between the raster lines is varied by the variation in the nozzle positions. When the high quality mode is selected, a microwave process is performed in which a row of the nozzles is assigned to each nozzle such that the nozzles for printing raster lines adjacent in the subject-scanning direction Y are not made to be adjacent to each other.

Data received by the printer 11 includes print job data sent from the host apparatus 110 and data sent from the host apparatus 120. Here, the print job data is created by the printer driver of the host apparatus 110 and includes print setting information, a print command, and print image data. The print image data is obtained by performing image processes such as a resolution conversion process, a color conversion process, and a halftone process, and a microwave process as necessary for image data of the display color system, and is data for which it is not necessary for the printer 11 side to perform an image process. On the other hand, data D includes print setting information and image data, and is data in which an image process is necessary for the image data thereof. In addition, the host apparatus 110 may transmit the print job data to the printer 11 via the communication section 19, and the host apparatus 120 may transmit the data D to the printer 11 via the USB I/F 55.

Next, a functional configuration of the printer will be described. The printer 11 includes an input portion 71, a print job conversion portion 72, an image processing portion 73, and a printing engine 74 in this order from the upstream side in the flow direction of the data process. Further, an input buffer 75, an intermediate buffer 76, and an output buffer 77, which temporarily store data in the course of the data process, are provided. The buffers 75 to 77 are respectively constituted by the RAM 69. In addition, in the embodiment, the input portion 71 forms an example of the input unit, and the image processing portion 73 and the printing engine 74 form an example of the printing unit. In addition, the image processing portion 73 forms an example of the image processing unit.

The input portion 71 includes the input I/F 65, the communication section 19, the USB I/F 55, and the memory I/F 54, described above. The input I/F 65 of the input portion 71 receives image data which is generated by the scan engine 78 based on data which is read by the line sensor 53 forming the scanner portion 14, and print setting information based on printing conditions which are set by selecting the copying mode in the printer 11. The communication section 19 of the input portion 71 receives the data D including the print setting information and the image data from the host apparatus 120. The USB I/F 55 of the input portion 71 receives the print job data from the host apparatus 110. The memory I/F 54 of the input portion 71 receives image data read from the memory card MC and print setting information based on printing conditions set by selecting the card printing mode in the printer 11.

The scan engine 78 performs a color conversion process so as to convert RGB data obtained by reading an original document into YUV data, and generates image data of a predetermined compression format (for example, a JPEG format) by performing a compression process for the YUV data, and the image data ID is input to the input I/F 65 of the input portion 71.

The memory card MC stores the image data ID of a picture image which is captured by, for example, a digital camera and is compressed to a predetermined compression format (for example, a JPEG format). In a case where the card printing is performed, when a user operates the operation portion 20, thereby images in the memory card MC are sequentially displayed on the display portion 21, and a printing execution operation is performed by selecting an image, the memory I/F 54 of the input portion 71 receives the image data ID from the memory card MC from the address destination instructed for a file system (not shown). At this time, print setting information SD based on the printing conditions set through the operation of the operation portion 20 by the user is also input to the input portion 71.

Figure 4:
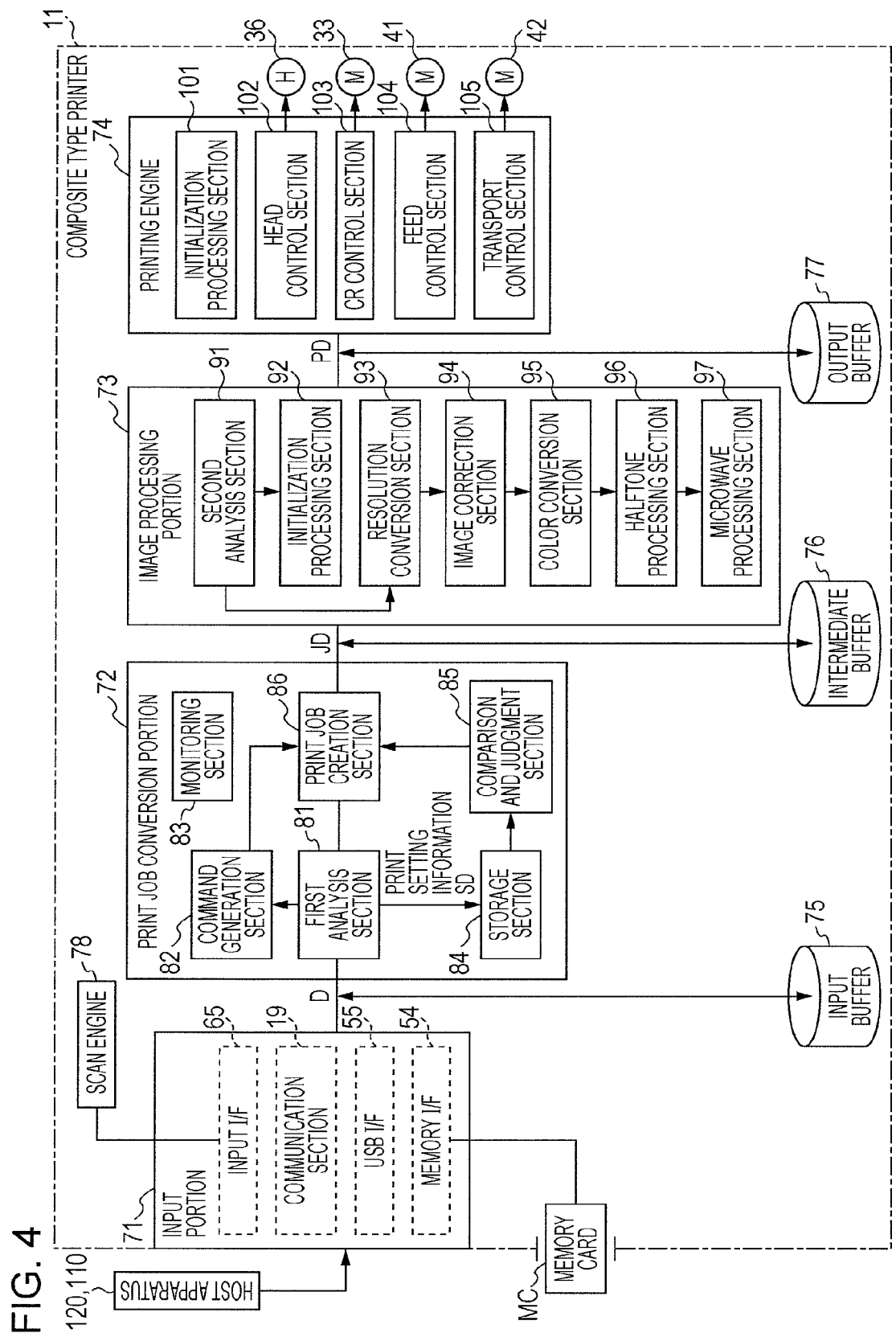
FIG. 4 is a block diagram illustrating a functional configuration of the printer.

The print job conversion portion 72, the image processing portion 73, and the printing engine 74 shown in FIG. 4 are configured through cooperation of software built by the CPU 66 executing a program stored in the nonvolatile memory 68 and hardware constituted by a variety of electronic circuits forming the ASIC 67. The respective portions 72 to 74 may be constituted by only software or only hardware.

The input portion 71 shown in FIG. 4 stores the input (received) data D in the input buffer 75. The data D includes the print setting information SD and the image data ID. The print job conversion portion 72 reads the data D from the input buffer 75, and generates print job data JD based on the read data D.

Figure 5A:
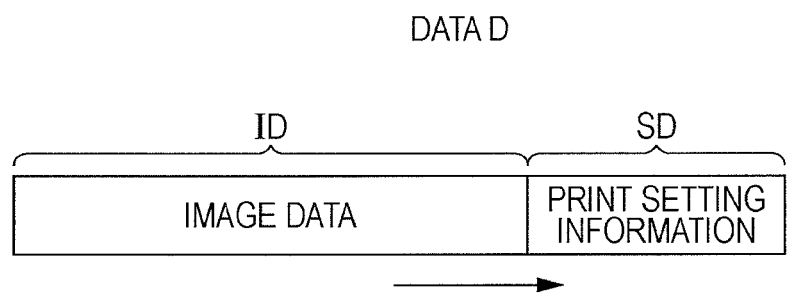
FIG. 5A is a schematic diagram illustrating a structure of data.

As shown in FIG. 5A, the data D includes the print setting information SD and the image data ID. In addition, in FIGS. 5A and 5B, the right part shows a head of the data, and the left part shows an end of the data.

The print setting information SD includes setting information such as an input resolution, a sheet kind, a sheet size, a printing color (color mode), printing quality, image correction, layout, and presence or absence of frame printing. Here, the input resolution indicates a resolution of the input image data ID. In addition, the sheet kind, the sheet size, the printing color, the printing quality, the image correction, the layout, and the like are indicated by values which contents set as printing conditions can be analyzed by the respective portions 72 to 74.

The "sheet kind" includes, for example, "regular paper, OHP sheet, matte paper, gloss paper, semi-gloss paper, . . . " as options. The "sheet size" includes, for example, "A4, 2L size, L size, postcard, Letter, Legal, . . . " as options. In addition, the "printing color" includes "color" and "monochrome (grayscale)" as options. The "printing quality" includes, for example, a "high quality mode" and a "draft mode" as options. In addition, the "layout" includes selection of "printing layout" and presence or absence of "frameless printing".

The print job conversion portion 72 includes a first analysis section 81, a command generation section 82, a monitoring section 83 which is an example of the determination unit, a storage section 84 which is an example of the preserving unit, a comparison and judgment section 85 which is an example of the judging unit, and a print job creation section 86 which is an example of the job generation unit.

The first analysis section 81 analyzes the data D read from the input buffer 75 and acquires the print setting information SD. The first analysis section 81 preserves the acquired print setting information SD in the storage section 84. In addition, at least a part of the print setting information SD and the image data ID used to create a command is sent to the command generation section 82.

The command generation section 82 generates a printing command based on at least a part of the print setting information SD and the image data ID. The printing command includes, for example, a form feed command, and the like. In addition, in a case where it is necessary to generate a printing command which is to be set based on data in the course of an image process or after the image process by the image processing portion 73, the command generation section 82 may be provided in both the print job conversion portion 72 and the image processing portion 73, or only in the image processing portion 73.

The monitoring section 83 monitors remaining data capacity of the print job data JD stored in the intermediate buffer 76. A monitoring method performed by the monitoring section 83 may include two kinds of methods. One is a method where the monitoring section 83 directly monitors remaining data capacity (remaining amount) of the intermediate buffer 76 and determines whether or not the remaining data is less than a defined value. The other is a method where the time taken until the remaining data of the intermediate buffer 76 becomes less than a defined value is obtained based on the capacity of the stored print job data JD and the process speed of the image processing portion 73, and it is determined that the remaining data becomes less than the defined value when a measured time (elapsed time) where time measurement starts from the start time point of storing the print job data JD in the intermediate buffer 76 reaches the time taken. Remaining data monitored by the monitoring section 83 is not limited to that of the intermediate buffer 76, and remaining data of the output buffer 77 may be monitored. In this case, the monitoring section 83 monitors whether or not remaining data of the output buffer 77 is less than a defined value. In this example, the defined value is set to a value immediately before image data to be processed by the image processing portion 73 is absent from the intermediate buffer 76 or a value immediately before engine control data to be processed by the printing engine 74 is absent from the output buffer 77. Here, the defined value for the monitoring section 83 monitoring a remaining data amount may be arbitrarily set in a range from a value immediately before image data to be processed by the image processing portion 73 is absent from the intermediate buffer 76 to a value immediately before engine control data to be processed by the printing engine 74 is absent from the output buffer 77, and in the limit where waiting does not occurs in a printing operation of the printer 11.

The storage section 84 is a storage region for storing the print setting information SD acquired by the first analysis section 81. The storage section 84 has a storage capacity which can store at least two pieces of previous and present print setting information SD. The storage section 84 is constituted, for example, using a part of storage region of the RAM 69.

The comparison and judgment section 85 compares the previous and present print setting information SD when the previous and present print setting information SD are accumulated in the storage section 84, and judges whether or not both the pieces of print setting information SD are the same as each other. As a result of the comparison and judgment, if both the pieces of print setting information SD are the same as each other, a notification thereof is sent to the print job creation section 86, and if both the pieces of print setting information SD are not the same as each other (that is, different from each other), a notification thereof is sent to the print job creation section 86. In the embodiment, the print setting information SD includes only setting information necessary for comparison and judgment described later but may include spare setting information used for processes other than the comparison and judgment. In a case of including spare setting information, only the rest setting information excluding the spare setting information from the print setting information SD is compared and judged. Here, the setting information which is compared and judged indicates print setting information SD which is used for initialization processing sections 92 and 101 described later to initialize parameters.

The print job creation section 86 creates print job data JD based on the data D. At this time, the print job creation section 86 creates the print job data JD according to a judgment result from the comparison and judgment section 85. If the notification indicating that both the pieces of print setting information SD are the same as each other is received from the comparison and judgment section 85, the print job creation section 86 adds image data ID included in the present data D to print job data JD during creation (before being finished) which is created based on data D before the previous time and includes image data ID from the time before the previous time to the previous time. On the other hand, if a notification indicating that both the pieces of print setting information SD are different is received from the comparison and judgment section 85, the print job creation section 86 creates print job data JD and JD which respectively include image data ID without combining the image data ID included in the previous data and the image data ID included in the present data into a piece of print job data JD.

Figure 5B:
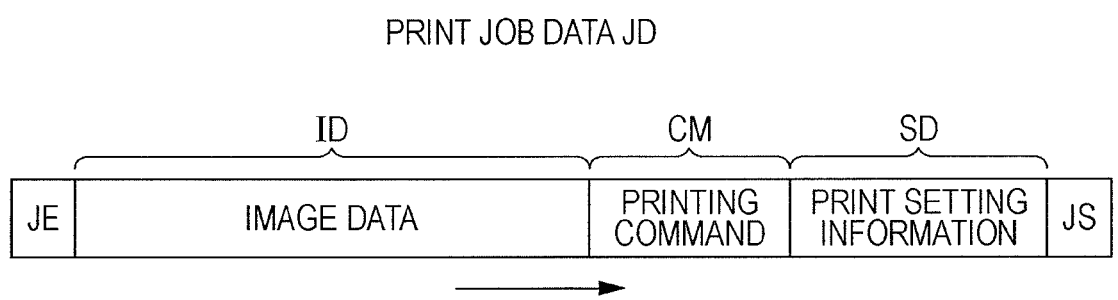
FIG. 5B is a schematic diagram illustrating a structure of the print job data.

The print job data JD shown in FIG. 5B is generated based on the data D which is input by the print job conversion portion 72 of the printer 11. As shown in FIG. 5B, job start "JS" indicating the starting of a job is disposed at the head, and job end "JE" indicating ending of the job is disposed at the end. In addition, the print setting information SD, the printing command CM, and the image data ID are sequentially disposed from the head side (right part of FIG. 5B) between the job start JS and the job end JE.

The print job creation section 86 adds "JS" to the head so as to start print job data, then disposes the print setting information SD, the printing command CM generated by the command generation section 82, the image data ID in this order, and does not add "JE". Without adding of "JE", creation of the print job data JD is in progress (before being finished). In a case where the next data D is input, and both of the previous print setting information SD and present print setting information SD are the same as each other, this printing command CM and this image data ID are arranged in this order so as to follow the previous image data ID in the print job data JD during the creation. While it is judged that the previous print setting information SD and present print setting information SD are the same, "JE" is not added, and the present printing command CM and the present image data ID are disposed following the previous image data ID.

In addition, it is judged that the previous print setting information SD is different from present print setting information SD, the print job creation section 86 adds "JE" to the rear of the previous image data ID, thereby finishing the print job data JD. Then, the print job creation section 86 newly adds "JS" to the head so as to start the next print job data, and disposes the present printing command CM and the present image data ID following "JS".

Here, there are cases where the print setting information SD in the present data D is stored in the storage section 84 and the next data D is not input (received) well. In this case, the image processing portion 73 in the subsequent stage may not confirm finish of the print job in a stand-by state since "JE" does not come. For this reason, in the embodiment, if a predetermined time comes, "JE" is added so as to finish the print job data JD. The predetermined time is set to when remaining data of the intermediate buffer 76 monitored by the monitoring section 83 is less than the defined value. In addition, if a notification indicating that remaining data of the intermediate buffer 76 is less than the defined value from the monitoring section 83 is received from the comparison and judgment section 85 even if a notification indicating that both the pieces of print setting information SD are different is not received, the print job creation section 86 adds "JE" at the time point so as to finish the print job data JD.

The image processing portion 73 includes a second analysis section 91, an initialization section 92, a resolution conversion section 93, an image correction section 94, a color conversion section 95, a halftone processing section 96, and a microwave processing section 97.

The second analysis section 91 acquires the print setting information SD and the printing command CM through analysis of the print job data JD, sends the print setting information SD to the initialization section 92, and sends the print setting information SD and the printing command CM to the printing engine 74. In this example, a variety of setting information such as the "input resolution", the "sheet kind", the "sheet size", the "printing color", the "printing quality", the "image correction", the "layout", and the "presence or absence of frame printing" included in the print setting information SD is sent to the initialization section 92.

The initialization section 92 performs an initialization process so as to set initial values of parameters which the respective sections 93 to 97 use for an image process based on the print setting information SD. The respective sections 93 to 97 performs an image process using the set initial values of parameters, and thereby can generate image data corresponding with the print setting information SD. In addition, details of the initialization process will be described.

The resolution conversion section 93 performs a resolution conversion process so as to convert an input resolution of the image data ID into a printing resolution (output resolution) thereof. Here, the printing resolution is determined depending on a printing mode of the "printing quality". A first printing resolution which is a high resolution is set in the high quality mode (sharpening mode), and a second printing resolution which is a low resolution is set in the draft mode. In addition, the resolution conversion section 93 also performs a variable magnification process so as to variably magnify (enlarge, reduce, or the like) the image size of the image data ID to a printing size in the resolution conversion process. In addition, in a case where a printing image is output to be larger than a paper sheet, a clipping process or the like where the printing image is clipped so as to be suitable for the printing size is performed in advance as necessary. Further, the image data ID includes, for example, JPEG image data, and attribute information such as the input resolution is also input to the input portion 71 along with the image data ID. The input resolution is one of the pieces of print setting information SD.

In a case where "presence of image correction" is set in the "image correction" selection item, the image correction section 94 performs an image correction process for the image data ID. The image correction in this example includes scene correction and red-eye correction. In the scene correction, a specific color is detected from the image data ID, and color correction corresponding to a scene specified from a position or a region of the detected specific color is performed for the image data ID. For example, in a case where blue is detected from a predetermined region (for example, an upper region) of the image data ID, the image correction section 94 regards the region as the "sky" and performs color correction suitable for a picture taken outdoors for the image data ID. In addition, in a case where a skin color is detected from the image data ID, a picture is regarded as photographing a figure, and color correction suitable for the figure picture is performed for the image data ID. The image correction section 94 performs a red-eye detection process for the image data ID, and if red eyes are detected, performs color correction for converting red of the eyes into normal colors (for example, black or brown) of the eyes for the image data ID.

The color conversion section 95 performs a color conversion process where the image data ID are color-converted from a color system for display into a color system for printing. Here, for example, in a case where the image data ID is JPEG data, the image data ID is decompressed to YUV image data in a decompression processing section (not shown), and further is color-converted from the YUV image data to RGB image data. The color conversion section 95 converts the RGB image data represented by the RGB color system into printing image data represented by the CMYK color system with reference to a color conversion table (not shown). At this time, if a printing color is color, a color conversion table for color is selected, and if a printing color is monochrome, a color conversion table for monochrome is used.

The halftone processing section 96 performs a process where CMYK pixel data having multi-step grayscales (for example, 256 grayscale values) is converted into CMYK pixel data having small-step grayscale values (for example, predetermined grayscale values of two to eight grayscales) which can be represented by the pixel electrodes 13. For example, in a case of two grayscales, the grayscale values are represented as two steps of presence of dots and absence of dots, and, for example, in a case of four grayscales, the grayscale values are represented as four steps of absence of dots, small dots, middle dots, and large dots. The halftone processing section 96 performs the halftone process using a well-known systematic dither method or error diffusion method.

The microwave processing section 97 performs a microwave process for the halftone data. The microwave processing section 97 allocates pixels (dots) to each nozzle in order to suppress banding (streak-shaped density unevenness) due to a cause that a gap (space between lines) in the subject-scanning direction Y of the dot lines (raster lines) which are printed in the main scanning direction is varied due to a variation in the nozzle positions (nozzle pitches) of the printing head 36. In the microwave process, dots (pixels) are allocated to the nozzles so as to change nozzles used to print printing dot lines adjacent to each other in the subject-scanning direction Y. The microwave process is performed when the printing quality is in the high quality mode, and is not employed in a draft mode. In this way, the image processing portion 73 stores the printing image data of the CMYK color system, generated by performing a variety of image processes for the image data ID, in the output buffer 77.

Here, the initialization processing section 92 sets and calculates initial values of various parameters which the respective sections 93 to 97 use for image processes by the use of the "input resolution", "sheet kind", "sheet size", "printing color", "printing quality", "image correction", and "layout (including presence or absence of frame printing)" in the print setting information SD. Hereinafter, the initialization process will be described in an order of the resolution conversion process, the image correction, the color conversion process, the halftone process, and the microwave process.

The initialization processing section 92 initializes parameters which the resolution conversion section 93 uses for the resolution conversion process based on the "input resolution", "sheet size", "printing quality", "image correction", "layout", and "presence or absence of frame printing". The parameters include setting values of a printing resolution, a printing size, a variable magnification, a decimation process, an interpolation process, and the like. As described above, the printing resolution is determined depending on a printing mode defined from the "printing quality". In other words, in a case of the high quality mode, the printing resolution is set to a "high resolution" (first resolution), and, on the other hand, in a case of the "draft mode", the printing resolution is set to a "low resolution" (second resolution). At this time, the printing size (printing image size) is calculated based on the "sheet size", "layout" and "presence or absence of frameless printing".

For example, in a case of "presence of frameless printing", a printing size is set such that a printing region exceeds a paper sheet region by a defined value. In addition, in a case of "absence of frameless printing", a printing size is set in consideration of the margins of the circumferential edge of the paper sheet region. When the printing size and the printing resolution are determined, there is a calculation of a variable magnification necessary to convert an image having the image size and the input resolution into a printing image having the printing size and the printing resolution. If the variable magnification is greater than 100% (that is, enlarged), an interpolation process for adding pixels between pixels is selected, and if the variable magnification is less than 100%, a decimation process for decimating pixels between pixels is selected. In addition, based on the variable magnification, an interpolation setting value indicating an interpolation extent (rate) of adding pixels in the interpolation process is calculated, or a decimation setting value indicating a decimation extent (rate) of decimating pixels in the decimation process is calculated.

As such, the initialization processing section 92 calculates the printing resolution, the printing size, and the variable magnification based on each piece of the setting information such as the "input resolution", "sheet size", "printing quality", "layout", and "presence or absence of frame printing", and calculates initial values of setting parameters for the resolution conversion process such as the decimation setting value or the interpolation setting value used for the decimation process or the interpolation process using the calculated values.

In addition, the initialization processing section 92 performs an initialization process for calculating initial values of parameters which the image correction section 94 uses for the image correction process (color correction process), based on the setting information of "image correction" (presence or absence of scene correction, or presence or absence of red-eye correction). For example, in a case of the "presence of scene correction" in the "image correction", there is a calculation of initial values of color correction parameters used for correction of various colors in the scene correction such as an initial value of the blue correction parameter used for blue correction, and an initial value of the skin color correction parameter used for skin color correction. In addition, in a case of the "presence of eye-red correction" in the "scene correction", an initial value of the red-eye correction parameter used for red-eye correction is calculated.

Further, the initialization processing section 92 performs an initialization process for selecting and setting a color conversion table which the color conversion section 95 uses for the color conversion process, according to the "sheet kind" and the "printing color". Since white of the paper sheet P is subtly different according to the kind of sheet, the initialization processing section 92 selects and sets a color conversion table suitable for a paper sheet color according to the kind of sheet. At this time, the initialization processing section 92 selects and sets a color conversion table for color if the printing color is color, and selects and sets a color conversion table for grayscale if the printing color is monochrome (grayscale).

In addition, the initialization processing section 92 calculates initial values of parameters which the halftone processing section 96 uses for the halftone process, based on the "sheet kind", "printing color" and "printing quality". Specifically, the initialization processing section 92 determines and checks for a halftone processing mode which defines the well-known systematic dither method or error diffusion method used for the halftone process, based on a "printing resolution" determined from the "sheet kind", the "printing color" and the "printing quality".

If the "printing color" is a "high quality mode", the initialization processing section 92 initializes parameters which the microwave processing section 97 uses for the microwave process. Further, the initialization processing section 92 secures (allocates) and initializes a buffer for image processing according to the image size. In addition, the initialization processing section 92 accesses and initializes the halftone processing section 96 and the microwave processing section 97, and sets process parameters.

The printing engine 74 includes an initialization process section 101, a head control section 102, a carriage control section (hereinafter, referred to as a "CR control section 103"), a feed control section 104, and a transport control section 105. The printing engine 74 acquires the printing command CM and the print setting information SD from the second analysis section 91 of the image processing portion 73 and acquires engine control data PD from the output buffer 77.

The initialization process section 101 performs an initialization process for setting initial values of parameters which the head control section 102, the CR control section 103, and the transport control section 105 use for controls, based on the print setting information SD. Here, control contents of the respective sections 102 to 105 will be first described before details of the initialization process is described. In addition, the engine control data PD includes head control data used by the head control section 102 for control of the printing head 36, motor control data used by the transport control section 105 for control of the transport motor 42, and the like.

The head control section 102 sends the head control data read from the output buffer 77 to the printing head 36, and controls the printing head 36 based on the sent head control data. A head driving circuit (not shown) embedded in the printing head 36 receives an ejection control signal generated from the head control data and the output pulse of the linear encoder 39, and performs ejection of ink from the nozzles of the printing head 36 based on the head control data, at an ejection timing synchronized with the ejection control signal.

The CR control section 103 analyzes head control data corresponding to one pass which is one scanning of the carriage 32, and thereby obtains a starting position and a stopping position in one pass of the carriage 32. In addition, the CR control section 103 controls the carriage motor 35 based on the printing command CM and the motor control data received from the second analysis section 91 such that the carriage 32 is moved from the starting position to the stopping position. The CR control section 103 grasps a position of the carriage 32 based on a count value of a carriage counter (not shown) which counts pulse edges of the output pulses of the linear encoder 39. The carriage counter counts a count value according to a position of the carriage 32 in the main scanning direction by adding the number of pulse edges input in an outgoing procedure where the carriage 32 becomes distant from the home position and by subtracting the number of pulse edges input an incoming procedure where the carriage 32 becomes close to the home position. The nonvolatile memory 68 stores a speed control table for controlling the carriage motor 35. The speed control table is a table indicating a relationship between carriage positions and carriage speed (carriage motor rotation speed), and is prepared for each printing mode (a high quality mode and a draft mode) determined from the printing quality.

The feed control section 104 feeds the paper sheet P by driving the feed motor 41 when printing is started or a form feed command is input.

The transport control section 105 transports the paper sheet P (paper feeding) by driving the transport motor 42 by a driving amount up to when the paper sheet P is disposed at the next printing position if the carriage 32 finishes one scanning (one pass). The transport control section 105 starts driving of the transport motor 42 in response to a transport starting command which is sent at a timing right before the carriage 32 finishes one scanning, from the CR control section 103. In addition, the transport control section 105 controls the transport motor 42 in response to the transport command and the motor control data.

The nonvolatile memory 68 stores a speed control table for controlling the transport motor 42. The speed control table is a table indicating a relationship between a position of a paper sheet during the transport (transport position) and a transport speed (transport motor rotation speed), and is prepared for each printing mode (a high quality mode and a draft mode) determined from the printing quality, and for each kind of sheet. When one kind of speed control tables is determined, the transport control section 105 selects therefrom a speed control table for the transport motor 42 according to a transport amount grasped from the transport command, and controls a speed of the transport motor 42 based on the selected speed control table, thereby performing one transport, in the course of transporting the paper sheet P by the transport amount. The transport control section 105 sends a carriage starting command to the CR control section 103 when one transport is completed. In this way, the driving of the carriage 32 and the transport of the paper sheet P are alternately performed, and thereby printing is performed on the paper sheet P.

The initialization process section 101 performs a process of generating a mask pattern for masking a part of the head control data in order to restrict an extrusion amount out of a paper sheet region of the head control data to a defined value (for example, a predetermined value in a range of 1 to 5 mm) or less when the frameless printing is performed, based on the "sheet size", "printing quality", and "presence or absence of frameless printing" of the print setting information SD. At this time, the printing size uses a printing size which has been previously calculated based on a printing resolution or the like according to a printing mode from the "printing quality". The extrusion amount is determined from the printing size and the sheet size, and mask pattern data capable of restricting the extrusion amount to the defined value is generated. The head control data and the mask pattern data are input to the head driving circuit of the printing head 36, and ink is prohibited from being ejected from the nozzles of the printing head 36 onto a mask region based on the mask pattern data.

In addition, in a case where the "printing quality" is a high quality mode, the initialization process section 101 initializes microwave operation mode parameters, which the head control section 102 uses when microwave printing is performed, according to microwave setting values. Further, the initialization process section 101 sets either color or monochrome (grayscale) as an initial value according to a designation value of the "printing color". In addition, the initialization process section 101 sets an initial value of the printing size according to the setting of the "sheet size". The initial value of the sheet size is used for a clipping process of cutting an appropriate size portion excluding an extrusion amount exceeding the sheet size when the head control data of a size exceeding the sheet size.

In a case of printing a plurality of pages in the same print job, the printer 11 according to the embodiment performs a paper feed and delivery overlapping control where delivery of a printed preceding paper sheet (paper delivery) and feed of a subsequent paper sheet (paper feed) are performed together. The paper feed and delivery overlapping control contributes to improvement in printing throughput when a plurality of paper sheets are printed since a time interval from printing completion of a preceding paper sheet to printing start of a subsequent paper sheet can be shortened as compared with a regular paper feed and delivery mode where a subsequent paper sheet starts to be fed after a preceding paper sheet is delivered. However, the paper feed and delivery overlapping control is not performed between different print jobs but the regular paper feed and deliver is performed.

This is because the printing engine 74 determines that a single print job is completed if job end "JE" in the print job data JD is detected, the printing engine 74 waits for delivery of a final page of the print job to be completed and then starts to feed a first page of the next print job. In addition, the completion of the delivery of the preceding paper is determined based on the fact that the rear end of the preceding paper is transported to a defined position located further on the downstream side in the transport direction than the supporting plate 38. Alternatively, the completion of the delivery of the preceding paper is determined based on a time point when the transport motor 42 is driven by a defined amount after reaching the defined position.

In addition, when print job data generated by the printer driver is input from the host apparatus 110, the print job conversion portion 72 rebuilds print job data JD based on a judgment result of the comparison and judgment section 85. In this case, however, since the printer driver of the host apparatus 110 has already performed a resolution conversion process, image correction, a color conversion process, and a halftone process, the image processing portion 73 performs only a microwave process in a high quality mode. Therefore, in settings of the initialization processing section 92 as well, only an initialization process related to the microwave process is performed. In addition, the microwave processing section 97 performs the microwave process only when the microwave process is necessary.

Next, an operation of the printer 11 having the configuration will be described with reference to FIGS. 6A to 7. FIG. 7 is a flowchart illustrating a print job creation process performed by the CPU 66. Here, a case where the printer 11 is powered on and then initial data is input will be described as an example. In the following description, there are cases where print setting information and image data included in preceding data D input previously (first) by the input portion 71 are respectively denoted by SD1 and ID1, and print setting information and image data included in subsequent data D input next time (second) are respectively denoted by SD2 and ID2. In other words, in relation to n-th input data, there may be denotations of print setting information SDn and image data IDn (where n=1, . . . , k (where k is a natural number equal to or more than 2)). In addition, print setting information SD in the data D input by the input portion 71 includes "input resolution", "sheet kind", "sheet size", "printing color", "printing quality", "image correction", and "layout", and "presence or absence of frameless printing". There are cases where the print setting information SD forming the data D input by the input portion 71 may be sent to the printer 11 from the host apparatus 120 along with image data ID, only some may be sent from the host apparatus 120 and the others may be set by the printer 11 and be input, and all may be set by the printer 11 and be input. In any case, the input portion 71 inputs data D including print setting information SD and image data ID. In addition, the print setting information SD and the image data ID may be input separately.

In step S1, it is determined whether or not data D is input. If data D is input, the flow proceeds to step S2, and if data D is not input, the flow proceeds to step S5.

In step S2, print setting information SD1 is preserved (stored). In other words, the first analysis section 81 acquires print setting information SD1 through analysis of the data D, and preserves the acquired print setting information SD1 in the storage section 84.

In next step S3, it is determined whether or not there are two pieces of print setting information SD. If there is only a piece of print setting information SD at this time, the flow proceeds to step S4, and if there are two pieces of print setting information SD at previous time and this time, the flow proceeds to step S7. In this example, after the printer 11 is powered on, since there is only a piece of print setting information SD at this time and thus the judgment result in step S3 is negative when the initial (first) data D is input, the flow proceeds to step S4.

In step S4, print job data JD starts to be created. That is to say, the print job creation section 86 generates print job data JD up to job start "JS", print setting information SD, printing command CM, and image data ID.

Figure 6A:
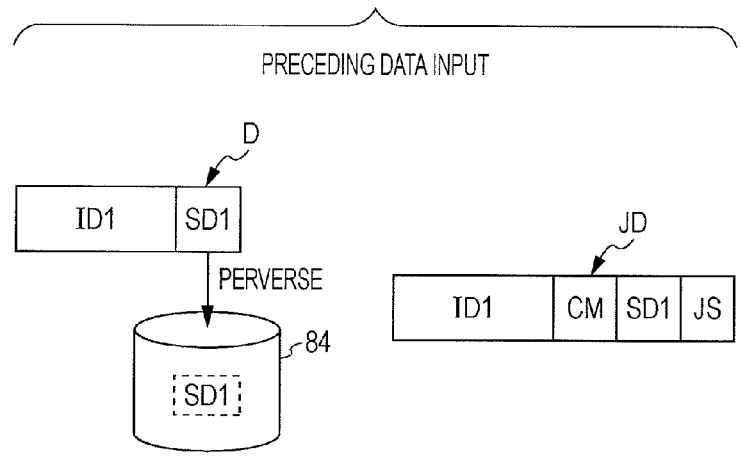
FIGS. 6A and 6B are schematic diagrams illustrating a generation method of the print job data.
Figure 7:
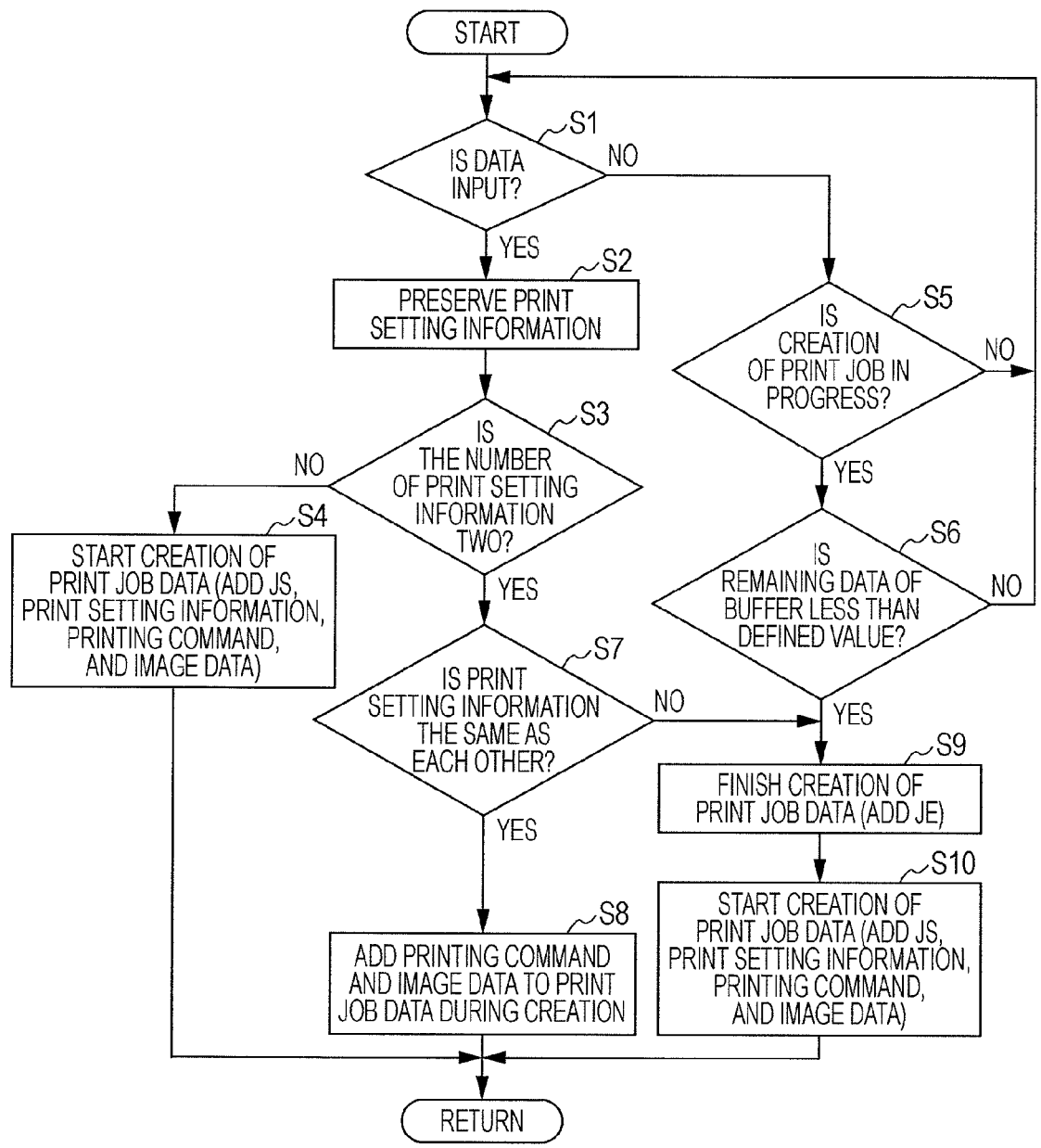
FIG. 7 is a flowchart illustrating a print job generation process.

As shown in FIG. 6A, if the preceding data D is input in this way, the print setting information SD thereof is preserved in the storage section 84, and the print job data JD on the way including the job start "JS", the print setting information SD, the printing command CM, and the image data ID is created. The print job data JD during creation is sequentially stored in the intermediate buffer 76. The image processing portion 73 in the subsequent stage sequentially reads the print job data JD from the intermediate buffer 76, and performs image processing based on the read print job data JD. The image processing portion 73 performs an initialization process for initializing parameters used for the image processing based on the print setting information SD in the print job data JD. In addition, by the use of the initialized parameters, the respective image processes are performed by the sections 93 to 97.

If the processes (steps S1 to S4) based on the first input data D is completed in this way, the flow returns to the process in step S1 again. In addition, if there is no input data D in step S1 (negative judgment), the flow proceeds to step S5.

In step S5, it is determined whether or not creation of print job is in progress. In other words, it is determined that creation of print job is in progress if the print job data JD is not finished by adding job end "JE" after the print job data JD starts to be created. For example, a flag for judging whether or not creation of the print job is in progress is prepared, the flag is set to "1" at the time of starting to create the print job, and the flag is set to "0" at the time of finishing creating the print job. If the flag is set to "1", it is determined that creation of the print job is in progress, and if the flag is set to "0", it is determined that creation of the print job is not in progress. In this example, since the print job data JD has started to be created in step S4 of the previous process, it is determined that creation of the print job is in progress (affirmative judgment in step S5). Therefore, the flow proceeds to step S6.

In step S6, it is determined whether or not remaining buffer data is less than a defined value. This determination is performed by the monitoring section 83. If the remaining buffer data is less than the defined value, the flow proceeds to step S9, and if not less than the defined value, the flow returns to step S1. In this way, if the remaining buffer data is not less than the defined value (negative judgment in step S6), the respective processes in steps S1, S5 and S6 are repeatedly performed until the next data is input (positive judgment in step S1).

Thereafter, if the next (second) data D is input, it is judged that the data D is input in step S1, the flow proceeds to step S2, and the print setting information SD is preserved. As a result, the previous print setting information SD1 and the present print setting information SD2 are preserved in the storage section 84. Since it is determined that there are two pieces of information, the previous print setting information SD1 and the present print setting information SD2 in next step S3, the flow proceeds to step S7.

In step S7, it is determined that the previous and present print setting information SD1 and SD2 are the same as each other. If both the pieces of print setting information SD1 and SD2 are the same as each other, the flow proceeds to step S8, and if both the pieces of print setting information SD1 and SD2 are different from each other, the flow proceeds to step S9.

For example, if both the pieces of print setting information SD1 and SD2 are the same as each other (affirmative judgment in step S7), present printing command and image data ID2 are added to the print job data JD during the creation in step S8. In other words, the print job creation section 86 adds the present printing command CM generated by the command generation section 82 and the present image data ID2 following the end (the end of the previous image data ID1) of the print job data JD during the creation.

On the other hand, if both the pieces of print setting information SD1 and SD2 are different from each other (negative judgment in step S7), the creation of the print job data JD is finished in step S9. In other words, the print job creation section 86 adds job end "JE" to the last of the print job data JD, and finishes the print job data JD.

In addition, in next step S10, print job data JD starts to be created. In other words, the print job creation section 86 generates the print job data JD up to job start "JS", print setting information SD2, printing command CM, and image data ID2. If the processes based on the second input data D are completed in this way, the flow returns to the process in step S1 again.

Figure 6B:
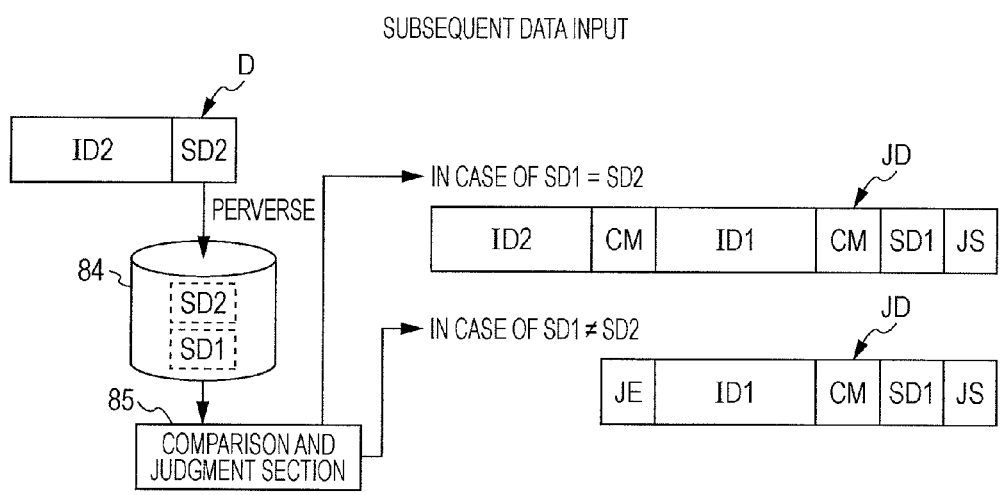

If the subsequent data D is input in this way, as shown in FIG. 6B, the print setting information SD2 is acquired through analysis of the print setting information SD2, and the acquired print setting information SD2 is preserved in the storage section 84. As a result, the previous and present print setting information SD1 and SD2 are preserved in the storage section 84. In addition, the comparison and judgment section 85 judges whether or not the previous and present print setting information SD1 and SD2 are the same as each other.

As shown in FIG. 6B, if the comparison and judgment section 85 judges that the previous and present print setting information SD1 and SD2 are the same as each other (SD1=SD2), the present printing command CM and the present image data ID2 are added to the end of the print job data JD during the creation (that is, the end of the previous image data ID1). That is to say, a single piece of print job data JD including the previous image data ID1 and the present image data ID2 is created. In this case, a state where creation of the print job data JD is in progress is continued. In addition, if the next (third) data D is input, and the comparison and judgment section 85 judges that the previous and present print setting information SD2 and SD3 are the same as each other, the present printing command CM and the present image data ID3 are added to the end of the print job data JD during the creation (that is, the end of the previous image data ID2). That is to say, a single piece of print job data JD including the first to the third image data ID1 to ID3 is created. In this way, a single piece of print job data JD including the first to n-th image data ID1 to IDn is created until it is judged that the previous and present print setting information SDn and SDn+1 are different from each other (negative judgment in step S7), or it is judged that remaining buffer data is less than a defined value (affirmative judgment in step S6).

On the other hand, as shown in FIG. 6B, if the comparison and judgment section 85 judges that the previous and present print setting information SD1 and SD2 are different from each other (SD1≠SD2), job end "JE" is added to the end of print job data JD during the creation. In this case, the print job data JD during the creation is finished. Then, next print job data JD (not shown in FIG. 6B) including the present printing command CM and the present image data ID2 starts to be created.

The print job data JD generated in this way is stored in the intermediate buffer 76 sequentially from the head, and is read from the intermediate buffer 76 sequentially from the head by the image processing portion 73. The second analysis section 91 of the image processing portion 73 sequentially analyzes the print job data JD from the head, and forwards the acquired print setting information SD to the initialization processing sections 92 and 101. The initialization processing section 92 obtains initial values of the respective parameters which the respective sections 93 to 97 use for image processes based on the print setting information SD, and sets the obtained initial values in the respective sections 93 to 97. In addition, the initialization process section 101 obtains initial values of the respective parameters which the respective sections 102, 103 and 105 use for controls based on the print setting information SD, and sets the obtained initial values in the respective corresponding sections 102, 103 and 105.

For example, if the print setting information SD1 and SD2 of the preceding data D and the subsequent data D are the same as each other, a single piece of print job data JD including the print setting information SD1 and the image data ID1 and ID2 is created. In this case, the initialization processing sections 92 and 101 perform an initialization process based on the print setting information SD1. In addition, image processes performed for the image data ID1 and ID2 by the respective sections 93 to 97 or various controls by the respective sections 102, 103 and 105 are performed using an initialization process result performed based on the print setting information SD1. That is to say, an initialization process based on the print setting information SD2 is omitted. The initialization process relatively takes time, but an initialization process related to the subsequent data D is omitted if both the pieces of the print setting information SD1 and SD2. In addition, if both the pieces of print setting information SDn and SDn+1 are the same each other up to the (n+1)-th data D, initialization processes related to subsequent data D are continuously omitted n times.

As described above in detail, in the embodiment, the following effects can be achieved.

(1) If previous (n-th) and present ((n+1)-th) print setting information SDn and SDn+1 are judged as being the same as each other (affirmative judgment in step S7), a single piece of print job data JD including first to the (n+1)-th image data ID1 to IDn+1 is created. As a result, an initialization process which each of the initialization processing sections 92 and 101 of the image processing portion 73 and the printing engine 74 performs based on the print setting information SD of the print job data JD may be performed for a plurality of pieces of data D having the same print setting information SD only once. In other words, an initialization process for second data D and thereafter of a plurality of pieces of data D having the same print setting information SD can be omitted. Therefore, it is possible to improve printing throughput of the printer 11 through omission of the initialization process.

(2) If it is judged that the previous (n-th) and present ((n+1)-th) print setting information SDn and SDn+1 are different from each other (negative judgment in step S7), job end "JE" is added so as to finish the print job data JD during creation. In addition, new print job data JD including the present print setting information SDn+1 and the present image data IDn+1 is created. Therefore, it is possible to perform appropriate image processing and printing control using appropriate parameters obtained by performing an initialization process based on the present print setting information SDn+1.

(3) If it is judged that remaining data of the buffer 76 (or 77) is less than a defined value, job end "JE" is added so as to finish print job data JD during creation. For this reason, it is possible to prevent a problem of delay in starting time of a printing control such as paper delivery based on job end "JE" without the job end "JE" although there is no data to be processed by the image processing portion 73 in the intermediate buffer 76 (or the output buffer 77). Therefore, it is possible to easily prevent reduction in printing throughput caused by delay in this kind of printing control.

(4) As a defined value for the monitoring section 83 monitoring remaining data, in a range from a value immediately before image data to be processed by the image processing portion 73 is absent from the intermediate buffer 76 to a value immediately before engine control data to be processed by the printing engine 74 is absent from the output buffer 77, a value where waiting does not occurs in a printing control such as paper delivery by the printing engine 74 is employed. For this reason, it is possible to easily include more image data ID in a single piece of print job data JD by waiting for as long as possible. Therefore, as many initialization processes as possible can be omitted, and thus improvement in printing throughput through the omission of the initialization processes is further facilitated.

(5) In a case where a plurality of pieces of data D including the same print setting information SD are input, a single piece of print job data JD including the print setting information SD of the leading data D and the respective pieces of image data ID included in a plurality of pieces of data D is created. In other words, there is a configuration where image data ID of the subsequent data D is sequentially added to the print job data JD which starts to be created based on the preceding data D. For this reason, an initialization process for a plurality of pieces of image data ID is completed at one time without modification of the configurations of the image processing portion 73 and the printing engine 74. For example, there may be an employment of a configuration where the print job conversion portion 72 notifies the image processing portion 73 and the printing engine 74 of an instruction indicating that an initialization process is omitted even if a form of print job data JD where a plurality of pieces of image data ID are collected into one is not taken, but, in this case, it is necessary to modify the configurations of the image processing portion 73 and the printing engine 74 so as to handle the instruction indicating an initialization process is omitted. In contrast, according to the embodiment, it is not necessary to modify the configurations of the image processing portion 73 and the printing engine 74.

In addition, the embodiment may be altered to the following forms.

The invention is not limited to a configuration where a plurality of pieces of image data having the same print setting information SD are combined into a single piece of print job data JD. For example, even in a case where it is judged that previous and present print setting information SD are the same as each other, a single piece of print job data JD including a single piece of image data ID is created. In addition, preceding print job data and subsequent print job data are sent to the printing unit, and an instruction according to a judgment result of the judgment unit is sent to the image processing portion 73 and the printing engine 74 forming the printing unit. At this time, if both the pieces of print setting information SD are the same as each other, the printing unit is instructed to perform a printing process for the subsequent print job data using parameters obtained by performing an initialization process (a setting process of processing conditions) based on the print setting information SD of the preceding print job data. Instruction methods may include the following methods. For example, if it is judged that both the pieces of print setting information SD are the same as each other, a judgment result, or a flag for sending a notification indicating that an initialization process is not necessary (indicating that a previous initialization process result is used) is incorporated into subsequent print job data JD. The printing unit (the image processing portion 73 and the printing engine 74) determines if an initialization process is necessity or not necessary, and if unnecessary, the initialization process is omitted, and if necessary, the initialization process is performed. With this configuration as well, if both the pieces of print setting information included in the preceding print job data and the subsequent print job data are the same as each other, it is possible to omit an initialization process (a setting process of processing conditions) for the subsequent print job data.

Only an initialization process by any one of the initialization processing sections 92 and 101 of the image processing portion 73 and the printing engine 74 forming the printing unit may be omitted.

As the omitted initialization process in a case where the previous and present print setting information SDn and SDn+1 are the same as each other, only a part of initialization of parameters used for image processes performed by the respective portions 93 to 97 forming the image processing portion 73 may be omitted. In addition, a target for which the initialization processing section 92 performs an initialization process may appropriately change between the respective sections 93 to 97.

As the omitted initialization process in a case where the previous and present print setting information SDn and SDn+1 are the same as each other, only a part of initialization of parameters used for controls performed by the respective portions 102, 103 and 105 forming the printing engine 74 may be omitted. In addition, the initialization process section 101 may perform initialization processes for the respective sections 102 to 105, and in a case where the previous and present print setting information SDn and SDn+1 are the same as each other, may omit all or a part of the initialization processes for the respective sections 102 to 105. In addition, a target for which the initialization process section 101 performs an initialization process may appropriately change between the respective sections 102 to 105.

A defined value for the monitoring section 83 monitoring remaining data may be a value where creation of print job data JD is finished when image data to be processed by the image processing portion 73 is absent from the intermediate buffer 76. In addition, determination is performed based on count time, a time taken is obtained up to a predetermined time after image data to be processed by the image processing portion 73 is absent from the intermediate buffer 76, and creation of print job data JD is finished at a time point when the count time reaches the time taken. Further, instead of monitoring remaining data, creation of the print job data JD may be finished at a time point when a predefined setting time has elapsed after the print job conversion portion 72 starts to forward the print job data JD starts to the printing unit (the image processing portion 73 and the like) side in the subsequent stage.

The initialization process section of the printing engine 74 may initialize only parameters used for control of the printing head.

The print setting information SD is not limited to including all of sheet kind, sheet size, printing color, printing quality, image correction, layout, and presence or absence of frameless printing. For example, in a printing apparatus where the sheet kind is fixed, in a printing apparatus where the sheet size is fixed, in a printing apparatus where the printing color is fixed, in a printing apparatus where the printing quality (or printing resolution) is fixed, in a printing apparatus where the layout is fixed, in a printing apparatus where the image correction is fixed, and the like, information of which a value is fixed may not be included in the print setting information SD.

The printing apparatus is not limited to the ink jet type printer, and may employ a wire impact type printing apparatus, a heat transfer type printing apparatus, or an electrophotographic type printing apparatus. A printing apparatus which does not have a scanner function may be employed.

The technical spirit found in the embodiments and modified examples will be described in the following.

(1) The printing apparatus according to the aspect, wherein the image processing unit performs at least a color conversion process and a halftone process, and wherein the setting unit sets color conversion processing conditions used for the color conversion process, and halftone processing conditions used for the halftone process. According to this configuration, if both the pieces of print setting information are the same as each other, the setting of the color conversion processing conditions and the halftone processing conditions can be omitted for subsequent data.

(2) The printing apparatus set for (1), wherein the image processing unit further performs image correction for correcting of colors of image data as the image process, and wherein the setting unit further sets color correction processing conditions used for the image correction. According to the configuration, if both the pieces of print setting information are the same as each other, the setting of the color correction processing conditions can be omitted for subsequent data.

What is claimed is:

1. A printing apparatus which performs printing based on input data, comprising:
   an input unit that inputs data including print setting information and image data;
   a printing unit that performs a printing process based on the data;
   a setting unit that sets processing conditions which the printing unit uses for the printing process based on the print setting information included in the data; and
   a judging unit that compares print setting information included in preceding data which is previously input by the input unit with print setting information included in subsequent data which is input following the preceding data, and judges whether or not both the pieces of the print setting information are the same as each other,
   (A) wherein, if it is judged by the judging unit that both the pieces of the print setting information are the same as each other, the printing unit performs a printing process based on the preceding data and the subsequent data according to processing conditions which are set by the setting unit based on the print setting information of the preceding data, and
   (B) wherein, if it is judged by the judging unit that both the pieces of the print setting information are different from each other, the printing unit performs a printing process based on the preceding data according to processing conditions which are set by the setting unit based on the print setting information of the preceding data, and the printing unit performs a printing process based on the subsequent data according to processing conditions which are set by the setting unit based on the print setting information of the subsequent data.

2. The printing apparatus according to claim 1, further comprising a job generation unit that generates job data based on the data input by the input unit and outputs the generated job data to the printing unit,
   wherein the printing unit performs the printing process based on the job data,
   (A) wherein, if it is judged by the judging unit that both the pieces of the print setting information are the same as each other, the job generation unit generates a single piece of job data including the print setting information, image data included in the preceding data, and image data included in the subsequent data, and
   (B) wherein, if it is judged by the judging unit that both the pieces of the print setting information are different from each other, the job generation unit separately generates job data for each of the preceding data and the subsequent data.

3. The printing apparatus according to claim 2, further comprising a preserving unit that preserves the print setting information of the preceding data,
   wherein the job generation unit outputs the job data to the printing unit in an order to be generated from starting to finishing,
   wherein the printing apparatus further includes a determination unit that determines whether or not remaining data for which the printing unit does not perform a printing process is less than a defined value, of the job data before being finished, generated based on the preceding data, and wherein, if it is determined that the remaining data is less than the defined value, the job generation unit finishes the job data before being finished without waiting for subsequent data necessary for the judging unit to perform judgment.

4. The printing apparatus according to claim 3, wherein, in a case where it is determined by the determination unit that the remaining data is not less than the defined value,
- (A) if it is judged by the judging unit that both the pieces of the print setting information are different from each other, the job generation unit finishes the job data before being finished, and
- (B) if it is judged by the judging unit that both the pieces of the print setting information are the same as each other, the job generation unit adds image data of the subsequent data to the job data before being finished.

5. The printing apparatus according to claim 1,
wherein the printing unit includes an image processing unit that performs an image process for the image data, and
wherein the setting unit sets image processing conditions which the image processing unit uses for the image process based on the print setting information.

6. The printing apparatus according to claim 1,
wherein the printing unit includes a printing head that performs printing on a printing medium and a printing engine that controls the printing head, and
wherein the setting unit sets control processing conditions which the printing engine uses for control of the printing head based on the print setting information.

7. The printing apparatus according to claim 1, wherein the print setting information includes a resolution of image data, printing quality defining a printing resolution, and the kind of printing medium.

8. A printing method which performs printing based on input data, comprising:
inputting data including print setting information and image data;
causing a printing unit to perform a printing process based on the data;
setting processing conditions which the printing unit uses for the printing process based on the print setting information included in the data; and
comparing print setting information included in preceding data which is previously input in the inputting of the data with print setting information included in subsequent data which is input following the preceding data, and judging whether or not both the pieces of the print setting information are the same as each other,
(A) wherein, if it is judged that both the pieces of the print setting information are the same as each other, in the judging, a printing process is performed based on the preceding data and the subsequent data according to print processing conditions which are set in the setting of the processing conditions based on the print setting information of the preceding data, in the performing of the printing process, and
(B) wherein, if it is judged that both the pieces of the print setting information are different from each other, in the judging, a printing process is performed based on the preceding data according to processing conditions which are set in the setting of processing conditions based on the print setting information of the preceding data, and a printing process is performed based on the subsequent data according to processing conditions which are set in the setting of processing conditions based on the print setting information of the subsequent data, in the performing of the printing process.

* * * * *